(12) United States Patent
Sandu

(10) Patent No.: US 8,124,155 B2
(45) Date of Patent: Feb. 28, 2012

(54) COMPLETE FRACTIONATION WITH REVERSE OSMOSIS IN FOOD PROCESSING

(75) Inventor: Constantine Sandu, Tustin, CA (US)

(73) Assignee: Constantine Sandu, Solon, OH (US)

( * ) Notice: Subject to any disclaimer, the term of this patent is extended or adjusted under 35 U.S.C. 154(b) by 64 days.

(21) Appl. No.: 12/756,503

(22) Filed: Apr. 8, 2010

(65) Prior Publication Data

US 2010/0189851 A1 Jul. 29, 2010

Related U.S. Application Data

(63) Continuation of application No. 11/611,396, filed on Dec. 15, 2006, now abandoned.

(60) Provisional application No. 60/794,745, filed on Apr. 25, 2006.

(51) Int. Cl.
*A23L 1/212* (2006.01)

(52) U.S. Cl. ........ 426/478; 426/481; 426/489; 426/495; 426/518; 426/615

(58) Field of Classification Search .................. 426/478, 426/481, 489, 495, 518, 615
See application file for complete search history.

(56) References Cited

U.S. PATENT DOCUMENTS

| | | | |
|---|---|---|---|
| 3,479,266 A | 11/1969 | Rajan et al. | |
| 3,864,504 A | 2/1975 | Szabo et al. | |
| 4,083,779 A | 4/1978 | Combe et al. | |
| 4,437,934 A | 3/1984 | Nelson et al. | |
| 4,643,902 A | 2/1987 | Lawhon et al. | |
| 4,781,809 A | 11/1988 | Falcone, Jr. | |
| 4,925,690 A | 5/1990 | Odake | |
| 4,933,197 A | 6/1990 | Walker et al. | |
| 4,936,962 A | 6/1990 | Hatzidimitriu | |
| 5,051,236 A | 9/1991 | Michaels | |
| 5,057,197 A | 10/1991 | Perry et al. | |
| 5,096,590 A | 3/1992 | Watanabe et al. | |
| 5,403,604 A | 4/1995 | Black, Jr. et al. | |
| 5,496,577 A | 3/1996 | Gresch | |
| 5,837,311 A | 11/1998 | Zelkha et al. | |
| 6,291,000 B1 | 9/2001 | Hayakawa | |
| 6,977,092 B2 | 12/2005 | Mantius et al. | |
| 7,022,368 B2 | 4/2006 | Mantius et al. | |
| 2004/0194634 A1 | 10/2004 | Succar et al. | |
| 2005/0003069 A1 | 1/2005 | Mantius et al. | |
| 2005/0220957 A1 | 10/2005 | Winship et al. | |
| 2005/0260312 A1 | 11/2005 | Sandu et al. | |
| 2005/0260313 A1 | 11/2005 | Sandu et al. | |
| 2006/0008573 A1 | 1/2006 | Succar et al. | |
| 2006/0024413 A1 | 2/2006 | Crowley | |
| 2007/0237877 A1 | 10/2007 | Diosady et al. | |

FOREIGN PATENT DOCUMENTS

| | | |
|---|---|---|
| JP | 63-294768 | 12/1988 |
| JP | 03-091465 | 4/1991 |
| JP | 2004/059516 | 2/2004 |

OTHER PUBLICATIONS

Schobinger, U., et al., *Frucht- und Gemüsesäfte: Technolgie, Chemie, Mikrobiolgie, Analytik, Bedeutung, Rech.*, Eugen Ulmer GmbH & Co., Stuttgart (1987) pp. 370-376. Kessler, H. G., *Lebensmittel- und Bioverfahrenstechnik. Molkereitechnologie*, Verlag A. Kessler, München (1996) pp. 89-91.

Bottino, A. et al., *Integrated Membrane Processes for the Concentration of Tomato Juice*, Desalination, vol. 148, (2002) pp. 73-77.

*Primary Examiner* — Helen F Heggestad

(57) ABSTRACT

A method for producing fruit or vegetable paste, fruit or vegetable juice concentrate, and similar food products by using Complete Fractionation with Reverse Osmosis.

14 Claims, 9 Drawing Sheets

FIGURE 1. ŠULC- Čirić TECHNOLOGY.
*Schobinger et al.*
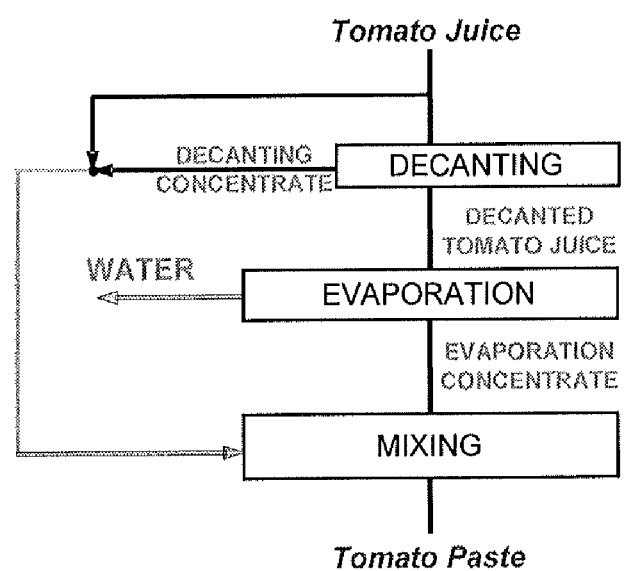

FIGURE 2. SZABO-HIRSCHBERG TECHNOLOGY.
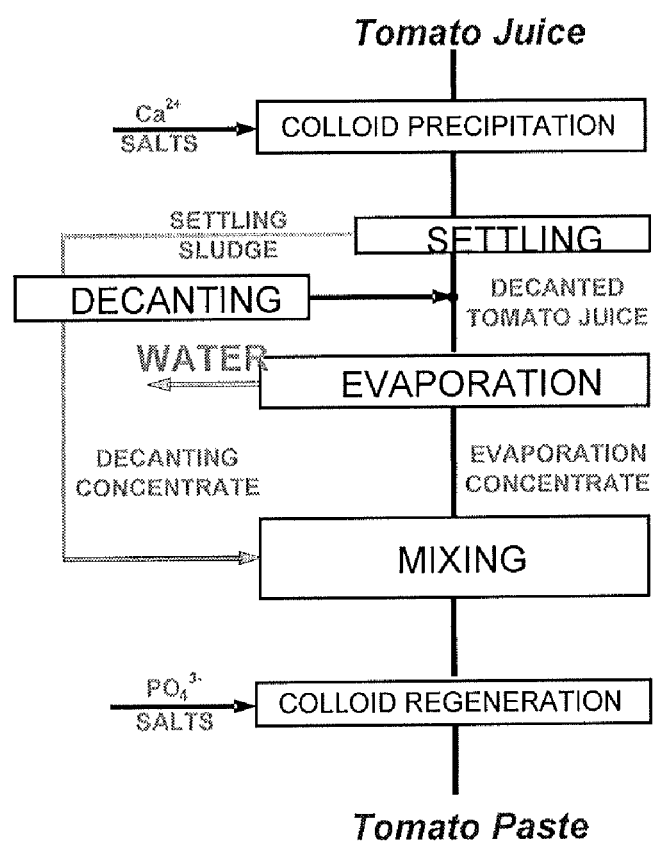

FIGURE 3. PCI-MEMBRANES TECHNOLOGY.
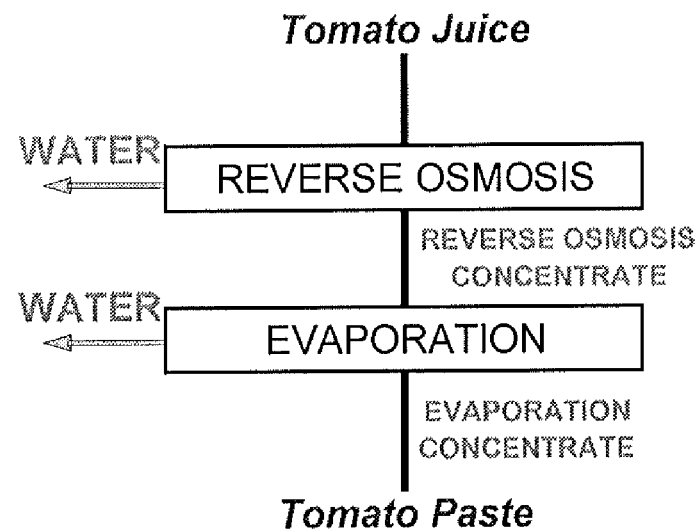

FIGURE 4. BOTTINO-AND-CO TECHNOLOGY.
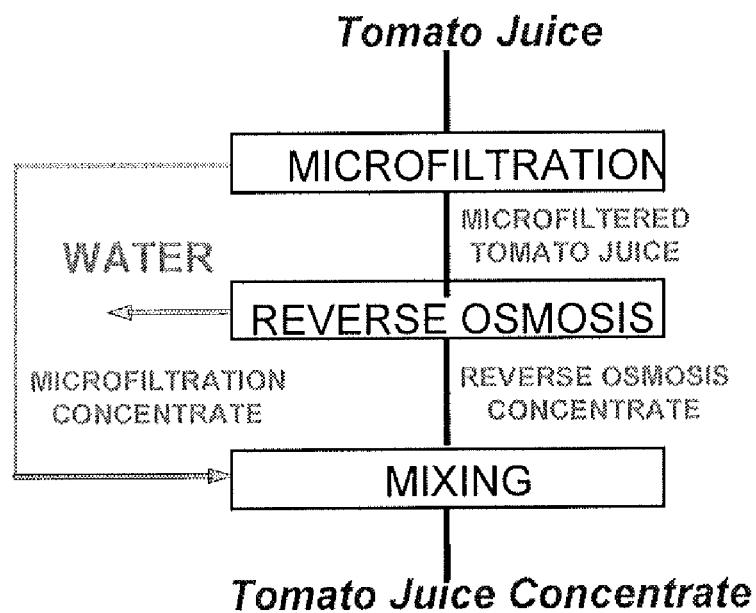

FIGURE 5. HAYAKAWA TECHNOLOGY.
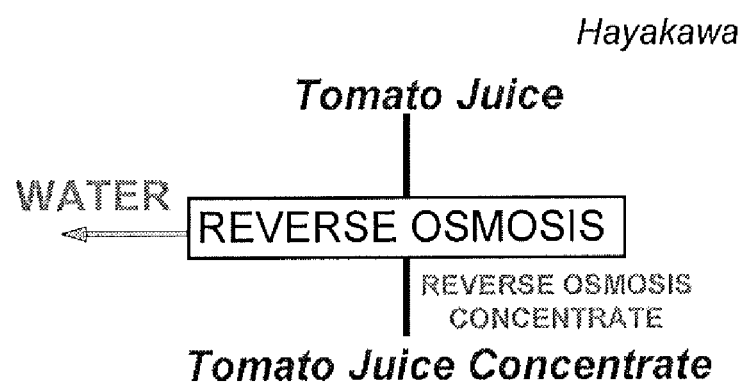

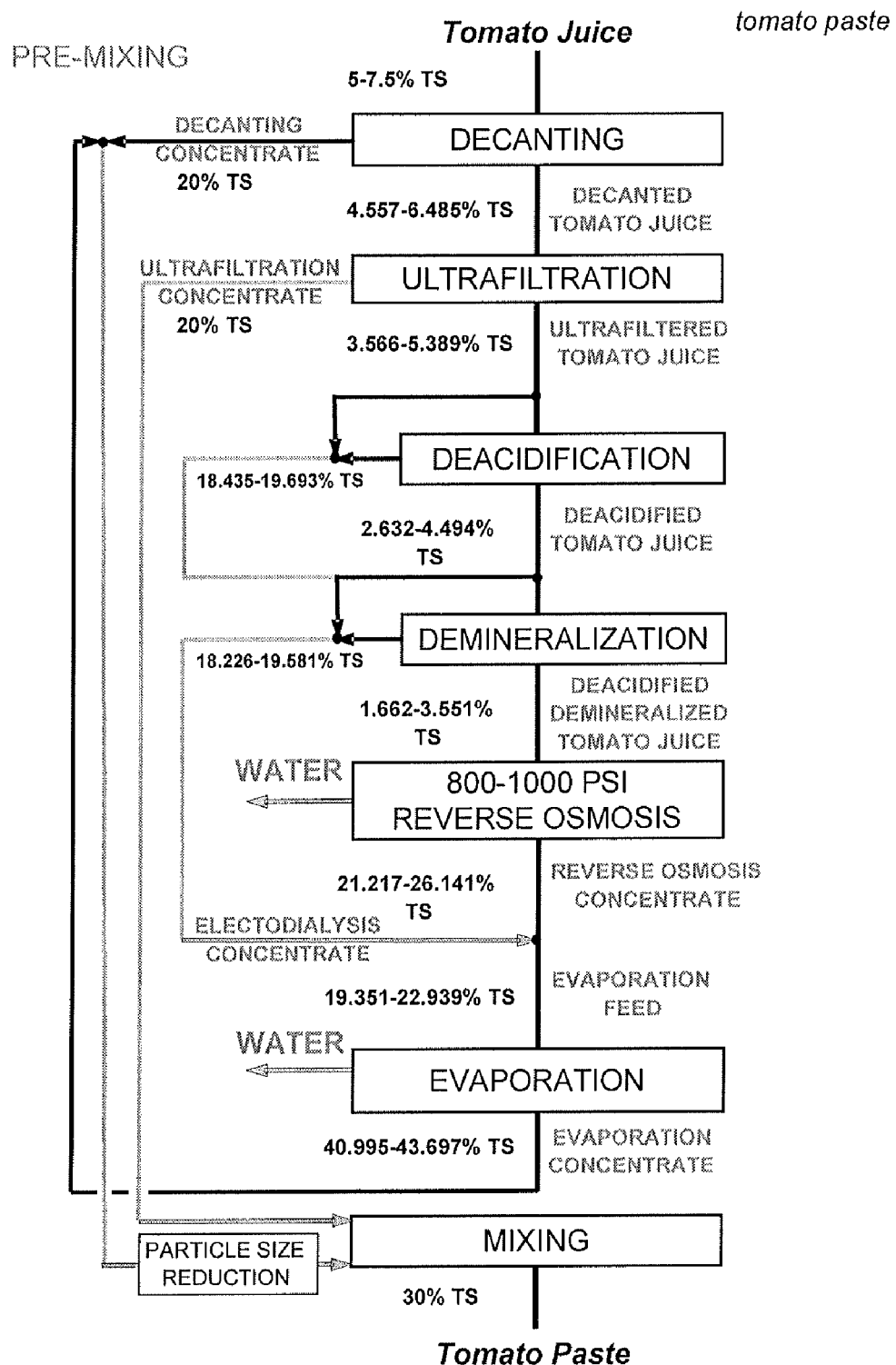
FIGURE 6. COMPLETE FRACTIONATION WITH REVERSE-OSMOSIS.

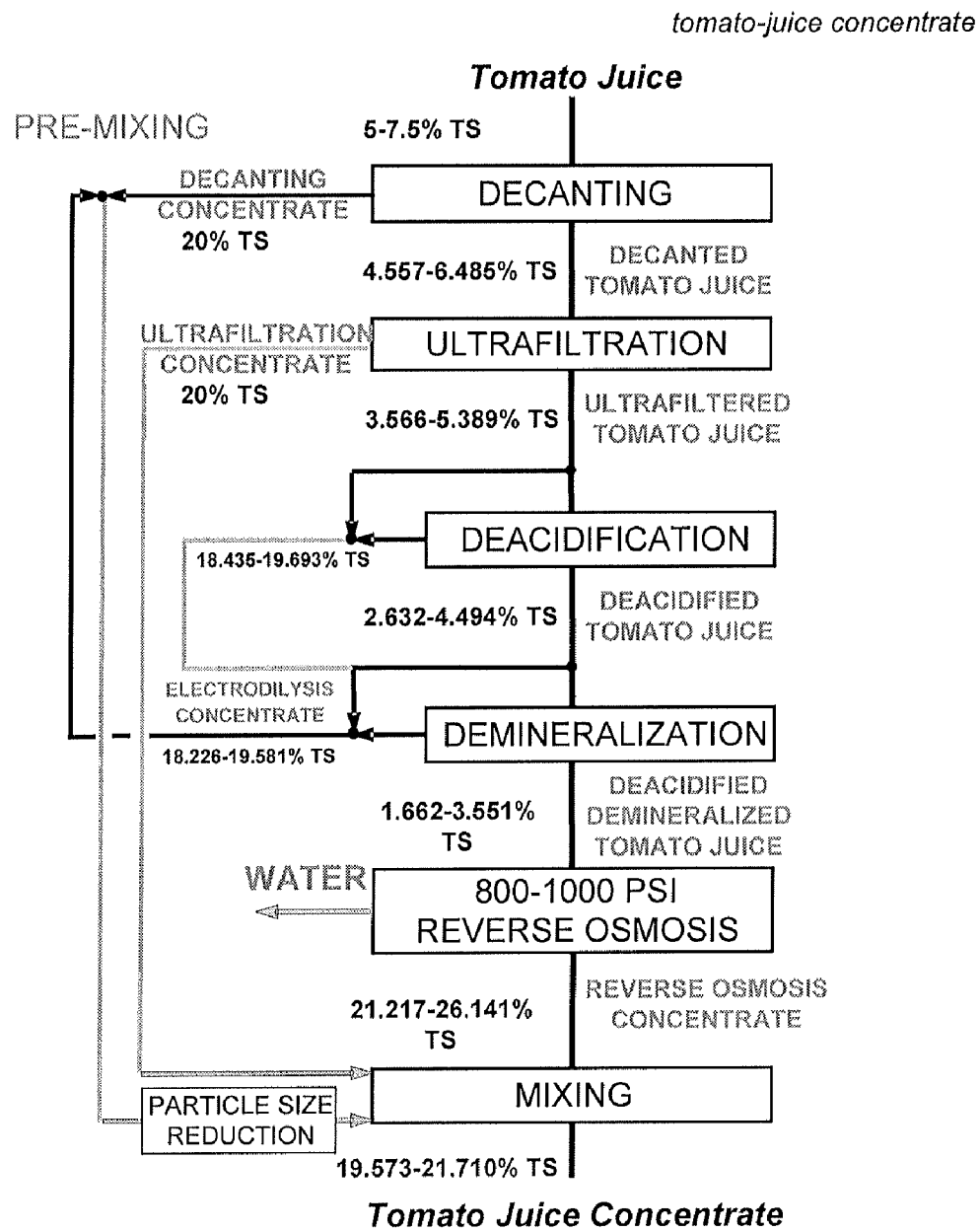
FIGURE 7. COMPLETE FRACTIONATION WITH REVERSE-OSMOSIS.

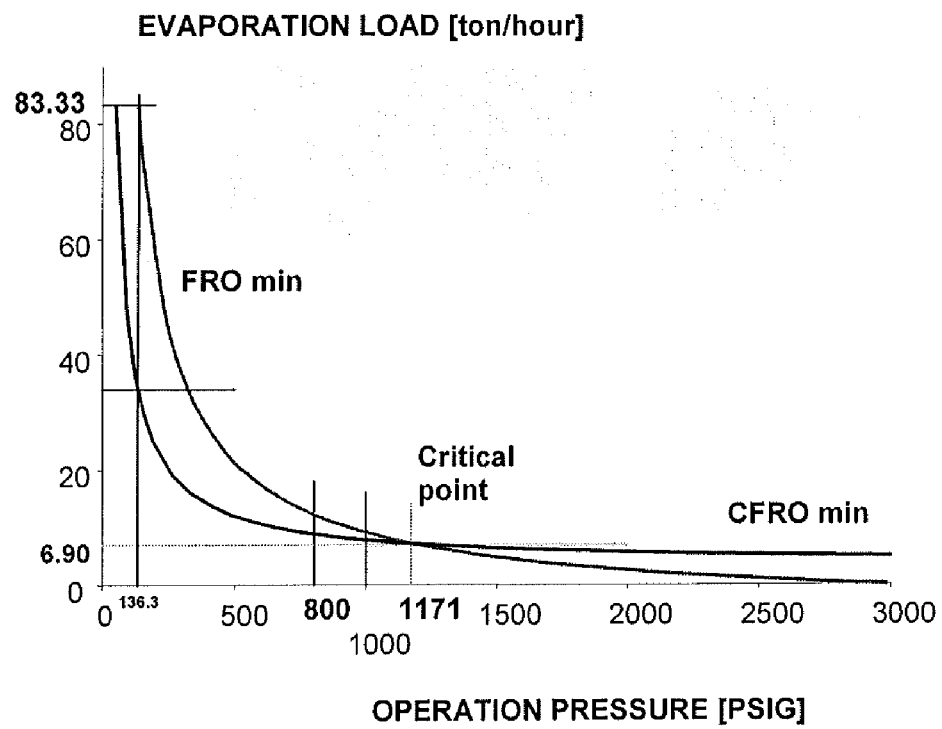
FIGURE 8a. EVAPORATION LOAD. parameter variation. *100 ton hr$^{-1}$ raw tomato juice at 5.0% TS. concentration-polarization factor =two*

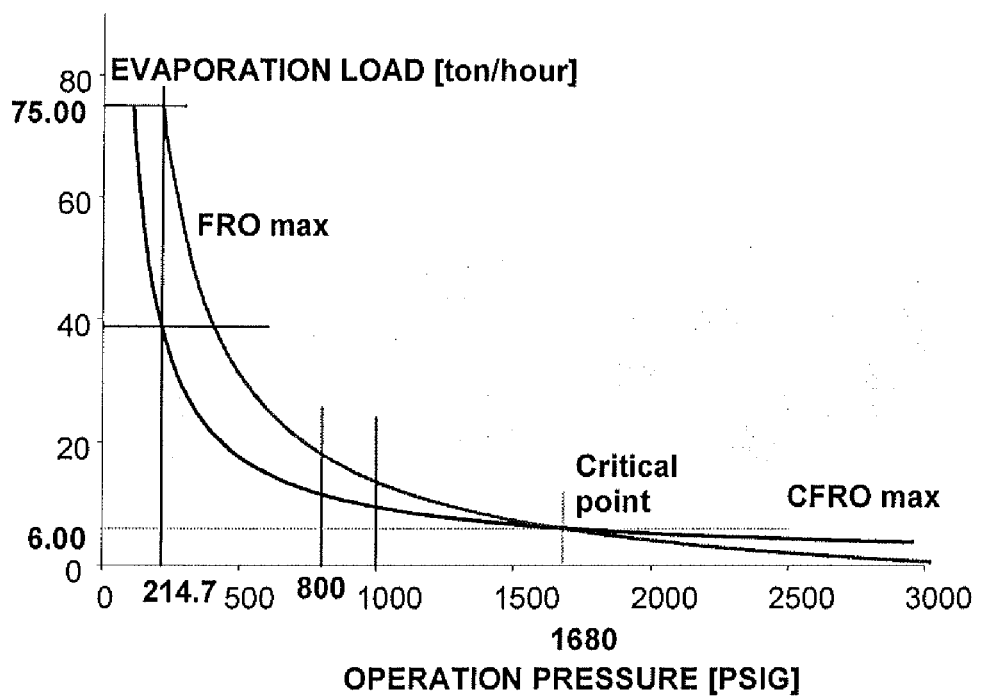
FIGURE 8b. EVAPORATION LOAD. parameter variation. *100 ton hr⁻¹ raw tomato juice at 7.5% TS. concentration-polarization factor =two*

COMPLETE FRACTIONATION WITH REVERSE OSMOSIS IN FOOD PROCESSING

CROSS REFERENCE TO RELATED APPLICATIONS

This continuation application claims the benefit of U.S. nonprovisional patent application Ser. No. 11/611,396, filed Dec. 15, 2006, and U.S. provisional patent application Ser. No. 60/794,745, filed on Apr. 25, 2006, both of the same title.

FIELD OF THE INVENTION

The present invention relates generally to a system and a method for producing food products. In particular, the present invention relates to a system and a method for producing tomato paste, tomato juice concentrate, and similar food products that can be manufactured using Complete Fractionation with Reverse Osmosis.

DESCRIPTION OF RELATED ART

Numerous technologies exist regarding fractionation and membrane separation as it relates to food processing. These include Šulc-Ćirić technology as described in Schobinger et al., *Frucht- und Gemüsesäfte: Technolgie, Chemie, Mikrobiolgie, Analytik, Bedeutung, Recht* (Stuttgart, Verlag Eugen Ulmer, 1987), by where the main fractionation of tomato juice occurs in a decanting unit operation. To ensure the flowability of the decanting concentrate, Šulc-Ćirić technology suggests mixing a small fraction of the raw tomato juice with a decanting concentrate at a ratio of 1:1. Another technology, Szabo-Hirschberg (U.S. Pat. No. 3,864,504), resorts to settling, which is a gravity-induced separation, for removing most of the suspended and colloidal species from the tomato juice. Decanting by mechanical centrifugation to settle the sludge allows further recovery of more decanted tomato juice. Here the evaporation concentrate can reach 50-60% total solids (TS). Another technology is PCI-Membranes, as described in Kessler, *Lebensmittel- und Bioverfahrenstechnik. Molkereitechnologie* (München, Verlag A. Kessler, 1996). With this technology there is no fractionation process. As a result, reverse osmosis applies to removing water from tomato juice at low total-solids levels only. PCI-Membranes technology extracts 55% of the water needed to manufacture tomato paste by reverse osmosis. The rest of the water is removed by thermal evaporation. Two other technologies described in Bottino et al., *Integrated Membrane Processes for the Concentration of Tomato Juice*, Desalination, Vol 148, (2002), pp. 73-77, and Hayakawa (U.S. Pat. No. 6,291,000), both rely on reverse osmosis with their tomato juice processing. However, the Bottino technology includes a microfiltration unit operation which precedes the reverse osmosis. Finally, the Succar and Tishinski technology described in U.S. Patent Application 20040194634, which is very similar to the Šulc-Ćirić technology, fractionates the tomato juice in a decanting unit operation and evaporates the decanted juice to produce a concentrate; without any reverse osmosis.

Another more recent process relies upon fractionation and membrane-separation, as disclosed in U.S. Patent Applications 20050260312 and 20050260313: This process will be identified here as Fractionation with Reverse Osmosis (FRO) Technology. The FRO Technology process begins with a decanting and microfiltration operation to fractionate the incoming tomato stream, followed by reverse osmosis and thermal evaporation to remove the water. While this approach employs decanting and microfiltration (i.e., fractionation) to take out the physiochemical species that cause membrane fouling in reverse osmosis, there exists a need for an enhanced method that can process tomato juice in a more cost and energy efficient manner. This can be achieved through a complete fractionation that applies an advanced membrane separation technique, as described in this invention, i.e. Complete Fractionation with Reverse Osmosis (CFRO) Technology.

SUMMARY

In accordance with one embodiment, a system and a method for producing a food product paste include separating a food substance into a decanted juice and a decanting concentrate using a decanter or centrifuge. The decanted juice is processed using an ultrafiltration system to produce an ultrafiltered juice that has been clarified and an ultrafiltration concentrate. The ultrafiltered juice is further processed using a two-stage electrodialysis unit operation to produce a deacidified demineralized juice that has been deacidified and demineralized and an electrodialysis concentrate. A first portion of water is removed from the deacidified demineralized juice by a reverse osmosis unit operation, thereby producing a reverse osmosis concentrate. The reverse osmosis concentrate is then mixed using a combination unit operation with the electrodialysis concentrate to form an evaporation feed. A second portion of water is removed from the evaporation feed using an evaporation unit operation to produce an evaporation concentrate. The evaporation concentrate is then pre-mixed using a pre-mixing unit operation with the decanting concentrate to form a first pre-mixture. The first pre-mixture is then processed using a particle size-reduction unit operation to form a first mixture having a reduced particle size. The first mixture is then mixed using a mixing unit operation with the ultrafiltration concentrate to produce a food product paste. Examples of food substances and their corresponding food product include: tomato paste; apple puree; and chili paste. Of course, other fruits, vegetables and spices can be used.

In accordance with another embodiment, a system and a method for producing a food juice concentrate include separating the food substance into a decanted juice and a decanting concentrate using a decanter or centrifuge. The decanted juice is processed using an ultrafiltration system to produce an ultrafiltered juice that has been clarified and an ultrafiltration concentrate. The ultrafiltered juice is further processed using a two-stage electrodialysis unit operation to produce a deacidified demineralized juice that has been deacidified and demineralized and an electrodialysis concentrate. A portion of water is removed from the deacidified and demineralized juice by a reverse osmosis unit operation, thereby producing a reverse osmosis concentrate. The electrodialysis concentrate is pre-mixed using a pre-mixing unit operation with the decanting concentrate to form a second pre-mixture. The second pre-mixture is then processed using a particle size-reduction unit operation to form a second mixture having a reduced particle size. The second mixture is then mixed using a mixing unit operation with the ultrafiltration concentrate and the reverse osmosis concentrate to produce a food juice concentrate. Examples of food substances and their corresponding food juice concentrate include: tomato juice and tomato juice concentrate, apple juice and apple juice concentrate. Of course, other fruits and vegetables can be used.

In accordance with one embodiment, a system and a method for producing tomato paste include the separating of a tomato juice stream into a decanted tomato juice and a decanting concentrate by means of a decanter or centrifuge. The decanted tomato juice is processed using an ultrafiltration system to produce an ultrafiltered tomato juice that has been clarified and an ultrafiltration concentrate. The ultrafiltered tomato juice is further processed using a two-stage electrodialysis unit operation to produce a deacidified demineralized tomato juice that has been deacidified and demineralized and an electrodialysis concentrate. A first portion of water is removed from the deacidified demineralized tomato juice by a reverse osmosis unit operation, thereby producing a reverse osmosis concentrate. The reverse osmosis concentrate is then mixed using a combination unit operation with the electrodialysis concentrate to form an evaporation feed. A second portion of water is removed from the evaporation feed using an evaporation unit operation to produce an evaporation concentrate. The evaporation concentrate is then pre-mixed, using a pre-mixing unit operation, with the decanting concentrate to form a first pre-mixture. The first pre-mixture is then processed using a particle size-reduction unit operation to form a first mixture having a reduced particle size. The first mixture is then mixed using a mixing unit operation with the ultrafiltration concentrate to produce a tomato paste product.

In accordance with another embodiment, a system and a method for producing tomato juice concentrate including the separating of a tomato juice stream into a decanted tomato juice and a decanting concentrate by means of a decanter or centrifuge. The decanted tomato juice is processed using an ultrafiltration system to produce an ultrafiltered tomato juice that has been clarified and an ultrafiltration concentrate. The ultrafiltered tomato juice is further processed using a two-stage electrodialysis unit operation to produce a deacidified demineralized tomato juice that has been deacidified and demineralized and an electrodialysis concentrate. A portion of water is removed from the deacidified demineralized tomato juice by a reverse osmosis unit operation, thereby producing a reverse osmosis concentrate. The electrodialysis concentrate is pre-mixed, using a pre-mixing unit operation, with the decanting concentrate to form a second pre-mixture. The second pre-mixture is then processed using a particle size-reduction unit operation to form a second mixture having a reduced particle size. The second mixture is then mixed using a mixing unit operation with the ultrafiltration concentrate and the reverse osmosis concentrate to produce a tomato juice concentrate.

BRIEF DESCRIPTION OF THE DRAWINGS

FIG. 1 is the simplified process diagram of Šulc-Ćirić Technology.

FIG. 2 depicts the process diagram of Szabo-Hirschberg Technology.

FIG. 3 outlines the concept of PCI-Membranes Technology.

FIG. 4 is the process diagram of Bottino et al. Technology.

FIG. 5 shows the Hayakawa Technology for manufacturing tomato juice concentrate.

FIG. 6 shows a process diagram for one embodiment of the current invention applied to tomato-paste processing; decanting concentrate plus evaporation concentrate=first pre-mixture; first pre-mixture after particle-size reduction=first mixture.

FIG. 7 shows one embodiment of the current invention process flow as applied to tomato juice concentrate manufacturing; decanting concentrate plus electrodialysis concentrate=second pre-mixture; second pre-mixture after particle-size reduction=second mixture.

FIG. 8a shows a graphical representation of the evaporation load as function of operation pressure in reverse osmosis; 5.0% TS in raw tomato juice; CFRO Technology vs. FRO Technology.

FIG. 8b shows a graphical representation of the evaporation load as function of operation pressure in reverse osmosis; 7.5% TS in raw tomato juice; CFRO Technology vs. FRO Technology.

DETAIL DESCRIPTION OF THE INVENTION

Complete Fractionation with Reverse Osmosis Technology (CFRO) is useful for the manufacture of food product paste and juice concentrate, and relies upon an advanced membrane-separation technique (an energy efficient process) to remove most of the water from raw fruits-and-vegetables juices. While it may be used with many fruit and vegetable juices, an example of processing tomato juice will be described. This in no way limits the possible fruit and vegetable juices which may be used.

Tomato Paste Processing

During CFRO tomato processing, raw tomato juice is split into four technical streams, before water is removed by membrane separation and thermal evaporation: (1) decanting concentrate, (2) ultrafiltration concentrate, (3) electrodialysis concentrate, and (4) deacidified demineralized tomato juice. See FIG. 6.

The process diagram of CFRO Technology consists of three main segments: (a) complete-fractionation, (b) water-extraction, and (c) product-assembling. The main goals of complete-fractionation are to remove insoluble compounds (decanting), colloidal pectic substances (ultrafiltration), osmotically-active organic acids (deacidification), and osmotically-active mineral salts (demineralization), before the deacidified-demineralized tomato juice goes into the reverse osmosis unit operation. Deacidification and demineralization are part of a two-stage electrodialysis unit operation. The deacidified-demineralized tomato juice is an almost pure solution of fructose-glucose-sucrose in water, whose tendency towards membrane fouling is minimized, and whose osmotic pressure is practically reduced to that of sugars in water.

The main goal of water-extraction is to remove the moisture from raw tomato juice. Taking full advantage of the complete-fractionation process, reverse osmosis now can take out 84-91% of the total amount of water needed to make 30%-TS tomato paste, from raw tomato juice at 5-7.5% TS. The assumptions involved in arriving at this performance are: (a) Existing equipment in reverse osmosis can operate at as much as 800-1000 pounds-force per square inch gauge (PSIG), (b) Reverse-osmosis concentration-polarization factor is conservatively taken to be two. (c) The remainder of water (16-9%) is extracted by thermal evaporation, which can allow the use of a small, efficient, multiple-effect evaporator, operating with falling-film, at very low temperatures (vacuums).

The purpose of product-assembling is to recombine the decanting concentrate (20% TS), ultrafiltration concentrate (20% TS), and evaporation concentrate (40-44% TS) into tomato paste (30% TS). By comparison, tomato juice processing requires recombining four streams, decanting concentrate (20% TS), ultrafiltration concentrate (20% TS), electrodialysis concentrate (18-20% TS), and reverse osmosis concentrate (21-27% TS) into tomato juice concentrate (19-22% TS). Compare FIGS. 6 and 7.

In accordance with one embodiment, a system and method for producing tomato paste includes separating a tomato stream into a decanted tomato juice and a decanting concentrate by a decanter or centrifuge. The decanted tomato juice is processed using an ultrafiltration system to produce an ultrafiltered tomato juice that has been clarified and an ultrafiltration concentrate. The ultrafiltered tomato juice is further processed using a two-stage electrodialysis unit operation to produce a deacidified demineralized tomato juice that has been deacidified and demineralized and an electrodialysis concentrate. A first portion of water is removed from the deacidified demineralized juice component by a reverse osmosis unit operation, thereby producing a reverse osmosis concentrate. The reverse osmosis concentrate is then mixed using a combination unit operation with the electrodialysis concentrate to form an evaporation feed. A second portion of water is removed from the evaporation feed using an evaporation unit operation to produce an evaporation concentrate.

The evaporation concentrate is then pre-mixed using a pre-mixing unit operation with the decanting concentrate to form a first pre-mixture. The first pre-mixture is then processed using a particle size-reduction unit operation to form a first mixture having a reduced particle size. The first mixture is then mixed using a mixing unit operation with the ultrafiltration concentrate to produce a tomato paste product. See FIG. 6.

FIG. 6 illustrates the CFRO Technology applied to tomato-paste processing. As a mechanical separation, the decanting unit, such as an advanced continuous decanter, removes the insoluble compounds from raw tomato juice, which typically has 5-7.5% wt. total solids. The result is a decanting concentrate at 20% TS and a decanted tomato juice at 4-7% wt. TS. The total-solids level of the decanting concentrate is in the middle of the range suggested by Schobinger, for processing of fruit and vegetables, i.e. 15-25% TS.

As the first membrane separation in CFRO Technology, ultrafiltration removes the colloidal compounds from the incoming stream of decanted tomato juice. In the industrial application of CFRO Technology, the removal of colloidal compounds from the decanted tomato juice may be done in three stages, microfiltration, ultrafiltration, and nanofiltration, or in one stage of ultrafiltration. Using advanced membrane separation techniques in the filtration process does allow the ultrafiltration concentrate to reach the recommended 20% TS level, while the ultrafiltered tomato juice has lower % wt. total solids than the decanted tomato juice has.

Once the tomato insolubles have been removed by decanting, and the tomato colloids have been taken out during the ultrafiltration process, the electrodialysis unit operation is designed to extract the organic acids and mineral salts from the ultrafiltered tomato juice. To accommodate both the specificity of ionic species and the solubilities of ionic species, electrodialysis needs to operate in two stages: first, deacidifying the ultrafiltered tomato juice, thereby producing a deacidified tomato juice and an organic-acids concentrate; second, processing the deacidified tomato juice, thereby producing a demineralized juice and a minerals concentrate. In addition, the transport of ionic species through separation membranes requires a carrier fluid.

Since utilizing water as a carrier fluid would defeat the whole purpose of fractionation, both deacidification and demineralization unit operations resort to using a small fraction of their corresponding incoming stream as a carrier fluid. The organic-acids concentrate is mixed with a small fraction of ultrafiltered tomato juice, and the minerals concentrate is mixed with a small fraction of deacidified tomato juice. Typically 5% of ultrafiltered tomato juice or deacidified tomato juice, respectively, may be utilized as carrier fluid. Furthermore, the organic-acids concentrate may be mixed with a small fraction of deacidified tomato juice to increase the actual amount of carrier fluid at the demineralization step. At the end of the electrodialysis processing step, the minerals- and organic-acids-concentrates may be mixed to form an electrodialysis concentrate. This electrodialysis concentrate may have 18-20% TS.

The recommended equipment for electrodialysis needs advanced separation membranes, tailored to the specific compositions of ultrafiltered tomato juice and deacidified tomato juice. The electrodialysis equipment is best used when the electrical conductivity of deacidified-demineralized tomato juice is, at a minimum, 0.5 mSiemens cm$^{-1}$.

Decanting and ultrafiltration unit-operations in CFRO Technology remove insoluble and colloidal compounds from raw tomato juice; these compounds are osmotically inactive. As a result, the osmotic pressure of ultrafiltered tomato juice is 68.1-107.3 PSIG. By comparison, after electrodialysis, the deacidified-demineralized tomato juice has an osmotic pressure of only 25.7-53.7 PSIG. Thus, the osmotic pressure of the incoming stream to reverse osmosis has been lowered by 50%. Accordingly, CFRO Technology will allow greater water-removal capacities during the reverse osmosis unit operation, with huge economical advantages over competitive technologies, like FRO Technology.

Decanting, ultrafiltration, and electrodialysis (deacidification and demineralization) unit operations define the complete fractionation portion of CFRO Technology. At the end of fractionation, the raw tomato juice (5-7.5% TS) is "completely fractioned" in four streams: decanting concentrate (20% TS), ultrafiltration concentrate (20% TS), electrodialysis concentrate (18-20% TS), and deacidified-demineralized tomato juice (1.5-3.5% TS).

The next two unit operations represent the water extraction portion of CFRO Technology: reverse osmosis and evaporation.

As the third membrane separation in CFRO Technology (following ultrafiltration and electrodialysis), reverse osmosis is designed to remove most of the water from the deacidified demineralized tomato juice. The reverse osmosis unit operation can remove 84-91% of the total amount of water needed to make 30%-TS tomato paste.

The equipment used in reverse osmosis should operate at as much as 800-1000 PSIG. Also, the reverse-osmosis concentration-polarization factor ought to conservatively take the value two. Under these conditions, reverse osmosis unit operation can concentrate the deacidified-demineralized tomato juice from 1.5-3.5% TS to the reverse osmosis concentrate with 21-27% TS. Similarly to ultrafiltration, reverse osmosis has to employ some of the most advanced membrane separation techniques like vibratory shear-enhanced processing (V-SEP) equipment.

The reverse osmosis concentrate (21-27% TS) and electrodialysis concentrate (18-20% TS) are then mixed into the evaporation feed (19-23% TS).

Next, the evaporation feed is subjected to thermal evaporation. At this point, an evaporation unit operation needs to remove only 16-9% of the total amount of water needed to make 30%-TS tomato paste. As a result, the corresponding thermal evaporation load is low, ranging within 7.8-11.6 ton/hour, for a processing plant of 100 ton/hour raw tomato juice, for instance; where the operation pressure in reverse osmosis is in the range of 800-1000 PSIG. See FIG. 8 for the dynamics of evaporation load as a function of operating pressure in reverse osmosis. The resultant evaporation concentrate or evaporation concentrate (40-44% TS) is now a condensed water-solution of sugars, salts, and organic acids.

The evaporation equipment compatible with CFRO Technology can be an advanced falling-film evaporator. In addition, the falling-film evaporator can be operated at relatively low temperatures (high vacuums). Operating at low temperatures allows for a minimum fouling/scaling of the heat transfer surfaces in the falling-film evaporator.

The last portion of CFRO Technology revolves around a set of three unit operations, whose purpose is to "recombine" the tomato juice fractions into tomato paste, called product assembling.

In one embodiment, the step of processing and recombining the reverse osmosis concentrate, the decanting concentrate, the ultrafiltration concentrate, and the electrodialysis concentrate comprises: a) mixing the reverse osmosis concentrate and the electrodialysis concentrate, thereby forming an evaporation feed; b) processing the evaporation feed to remove a second portion of water from the evaporation feed, thereby forming an evaporation concentrate; c) pre-mixing the evaporation concentrate and the decanting concentrate into a first pre-mixture; d) processing the first pre-mixture, thereby forming a first mixture having a reduced particle size; and e) mixing the first mixture and the ultrafiltration concentrate, thereby producing a tomato paste product. In this embodiment, the tomato product is tomato paste having 30% TS.

In tomato-paste processing, FIG. 6, the evaporation concentrate is brought next to the decanting equipment and combined with the decanting concentrate. This is the pre-mixing unit operation. The main reason for pre-mixing is to increase the flowability (pumpability) of the decanting concentrate, which is mostly rough fiber and insolubles from raw tomato juice. Also, pre-mixing will facilitate a more efficient particle size reduction, and a better performance in the mixing unit operation.

The equipment to conduct pre-mixing in CFRO Technology can be an advanced sludge-liquid mixer. However, the process stream called upon to improve the flowability of decanting concentrate should be shear-resistant. This is the case with the evaporation concentrate. By comparison, ultrafiltration concentrate that contains mostly colloidal pectic substances would not be suitable for pre-mixing.

The flowable (pumpable) combined stream that exits the pre-mixing now can be subjected to a controlled particle size reduction unit-operation. The optimum particle size in the tomato paste is determined by the desired viscosity for the final product. The equipment for particle size reduction can be a colloid mill for wet milling.

The role of the mixing unit operation is to combine all fractions derived from the raw tomato juice, other than the water removed in reverse osmosis and evaporation, into the final product, tomato paste. The purpose of CFRO Technology is to recover all valuable compounds originally in the raw tomato juice. However, at the point of mixing, the equipment should be designed to achieve a homogeneous mixture of all streams and—at the same time—to minimize the shear-induced degradation of pectins. The type of equipment compatible with mixing requirements in the CFRO Technology can be an advanced two-stream mixer.

In one embodiment, the step of processing and recombining the reverse osmosis concentrate, the decanting concentrate, the ultrafiltration concentrate, and the electrodialysis concentrate comprises: a) mixing the reverse osmosis concentrate and the electrodialysis concentrate, thereby forming an evaporation feed; b) processing the evaporation feed to remove a second portion of water from the evaporation feed, thereby forming an evaporation concentrate; c) pre-mixing the evaporation concentrate and the decanting concentrate into a first pre-mixture; d) processing the first pre-mixture, thereby forming a first mixture having a reduced particle size; and e) mixing the first mixture and the ultrafiltration concentrate, thereby producing a food product paste.

Tomato Juice Processing

In accordance with another embodiment, a system and method for producing tomato juice concentrate include separating a tomato stream into a decanted tomato juice and a decanting concentrate using a decanter or centrifuge. The decanted tomato juice is processed using an ultrafiltration system to produce an ultrafiltered tomato juice that has been clarified and an ultrafiltration concentrate. The ultrafiltered tomato juice is further processed using a two-stage electrodialysis unit operation to produce a deacidified demineralized tomato juice that has been deacidified and demineralized and an electrodialysis concentrate. A portion of water is removed from the deacidified and demineralized juice component by a reverse osmosis unit operation, thereby producing a reverse osmosis concentrate. The electrodialysis concentrate is pre-mixed using a pre-mixing unit operation with the decanting concentrate to form a second pre-mixture. The second pre-mixture is then processed using a particle size-reduction unit operation to form a second mixture having a reduced particle size. The second mixture is then mixed using a mixing unit operation with the ultrafiltration concentrate and the reverse osmosis concentrate to produce a tomato juice concentrate.

Manufacturing tomato juice concentrate according to CFRO Technology follows a similar process diagram as the diagram of tomato paste does in FIG. 6, with a few differences, see FIG. 7.

First, the process diagram of tomato juice concentrate does not need evaporation; accordingly, the entire amount of water can be removed by reverse osmosis. Under these conditions, the process parameters associated with complete fractionation unit operations plus reverse osmosis in FIG. 6 remain unchanged. See FIG. 7.

Second, to increase the flowability (pumpability) of the decanting concentrate (20% TS), which is mostly rough fiber and insolubles from raw tomato juice, now the only available stream is the electrodialysis concentrate (18-20% TS). Again, the essential aspect of pre-mixing, in all instances, is that the process stream called upon to improve the flowability of decanting concentrate be shear-resistant. This is the case with the electrodialysis concentrate.

Third, although it plays the same role as in tomato paste processing, the mixing unit operation now needs to accommodate a three-stream recombination process, see FIG. 7. The result is a tomato juice concentrate (19-22% TS).

Aside from the three major differences above, the equipment recommended for tomato paste processing equally applies in the manufacturing of tomato juice concentrate, according to CFRO Technology in FIG. 7.

In one embodiment, the step of processing and recombining the reverse osmosis concentrate, the decanting concentrate, the ultrafiltration concentrate, and the electrodialysis concentrate comprises: a) pre-mixing the electrodialysis concentrate and the decanting concentrate, thereby forming a second pre-mixture; b) processing the second pre-mixture, thereby forming a second mixture having a reduced particle size; and c) combining the second mixture, the ultrafiltration concentrate, and the reverse osmosis concentrate, thereby producing a food juice concentrate.

CFRO Technology

The foregoing description of CFRO Technology is considered as illustrative only of the principles of the invention. While specific embodiments of the invention have been shown and described, it will be obvious to those skilled in the art that various changes and modifications may be made therein, without departing from the scope, spirit, and intent of the invention as set forth in the appended claims.

Therefore, it is not desired to limit the invention to the exact construction and operation shown and described. Accordingly, all such suitable changes or modifications in structure or operation of Complete Fractionation with Reverse Osmosis (CFRO) Technology which may be resorted to are intended to fall within the scope of the claimed invention.

The invention claimed is:

1. A method of processing raw fruit/vegetable juice to form a food product, comprising:
   a) Separating a raw fruit/vegetable-juice stream into a decanted fruit/vegetable juice and a decanting concentrate, using centrifugal separation;
   b) Processing the decanted fruit/vegetable juice, by means of membrane ultrafiltration separation, thereby producing an ultrafiltered fruit/vegetable juice and an ultrafiltration concentrate, said ultrafiltered fruit/vegetable juice having been clarified;
   c) Processing the ultrafiltered fruit/vegetable juice, by means of electrodialysis, thereby producing a deacidified demineralized fruit/vegetable juice and an electrodialysis concentrate;

d) Removing a first portion of water from the deacidified demineralized fruit/vegetable juice by means of reverse osmosis, thereby producing a reverse osmosis concentrate;

e) Mixing the reverse osmosis concentrate and the electrodialysis concentrate, thereby forming an evaporation feed;

f) Processing the evaporation feed to remove a second portion of water from the evaporation feed, thereby forming an evaporation concentrate;

g) Pre-mixing the evaporation concentrate and the decanting concentrate, thereby forming a first pre-mixture;

h) Processing the first pre-mixture through a size-reduction unit operation, thereby forming a first mixture having a reduced particle size; and i) Lastly, mixing the first mixture and the ultrafiltration concentrate, thereby producing a fruit/vegetable paste product.

2. The method of claim 1, wherein the decanted concentrate, which contains insoluble fiber compounds, and the ultrafiltration concentrate, which contains colloidal pectic substances, are initially removed from the raw fruit/vegetable juice, and later are reintroduced into the final product, after the required amount of water has been extracted by reverse osmosis and evaporation.

3. The method of claim 1, wherein the electrodialysis concentrate, which contains the organic acids and the mineral salts, is initially mixed with the reverse osmosis concentrate, and next is sent to thermal evaporation as evaporation feed.

4. The method of claim 1, according to which the evaporation concentrate or the electrodialysis concentrate is mixed with the decanting concentrate to facilitate the flowability of the decanting concentrate, respectively, the particle-size reduction of the insoluble fiber compounds present in the decanting concentrate.

5. The method of claim 1, according to which a unit operation of particle size reduction is primarily employed to control the viscosity attributes of the final product, fruit/vegetable paste product.

6. The method of claim 1, where a fraction of the ultrafiltered juice is used as carrier fluid in the deacidification during the electrodialysis, and where a blend of the concentrate from deacidification and a fraction of the deacidified juice is used as carrier fluid in the demineralization during the electrodialysis.

7. A method of processing raw fruit/vegetable juice to form a food product, comprising:
a) Separating a raw fruit/vegetable-juice stream into a decanted fruit/vegetable juice and a decanting concentrate, using centrifugal separation;
b) Processing the decanted fruit/vegetable juice, by means of membrane ultrafiltration separation, thereby producing an ultrafiltered fruit/vegetable juice and an ultrafiltration concentrate, said ultrafiltered fruit/vegetable juice having been clarified;
c) Processing the ultrafiltered fruit/vegetable juice, by means of electrodialysis, thereby producing a deacidified demineralized fruit/vegetable juice and an electrodialysis concentrate, said deacidified demineralized fruit/vegetable juice having been deacidified and demineralized;
d) Removing the water from the deacidified demineralized fruit/vegetable juice by means of reverse osmosis, thereby producing a reverse osmosis concentrate;
e) Pre-mixing the electrodialysis concentrate and the decanting concentrate, thereby forming a second pre-mixture;
f) Processing the second pre-mixture through a size-reduction unit operation, thereby forming a second mixture having a reduced particle size; and
g) Last, mixing the second mixture, the ultrafiltration concentrate, and the reverse osmosis concentrate, thereby producing a fruit/vegetable juice concentrate product.

8. The method of claim 7, wherein the decanted concentrate, which contains insoluble fiber compounds, the ultrafiltration concentrate, which contains colloidal pectic substances, and the electrodialysis concentrate, which contains organic acids and mineral salts, are initially removed from the raw fruit/vegetable juice, and later are reintroduced into the final product, after the required amount of water has been extracted by reverse osmosis.

9. The method of claim 7, according to which a unit operation of particle size reduction is primarily employed to control the viscosity attributes of the final product, fruit/vegetable juice concentrate product.

10. A method of processing raw fruit/vegetable juice to form a food product, comprising:
a) Mechanical centrifugation to remove insoluble fiber compounds from the raw fruit/vegetable juice to produce a decanted fruit/vegetable juice and a decanting concentrate, in association with membrane ultrafiltration separation to remove colloidal pectic substances from the decanted fruit/vegetable juice;
b) Deacidification electrodialysis to remove organic acids from the ultrafiltered fruit/vegetable juice, in association with demineralization electrodialysis to remove mineral salts from the deacidified fruit/vegetable juice;
c) Reverse osmosis to remove minimum 84% to 91% of the total amount of water needed to be removed to make fruit/vegetable paste product; and
d) Reverse osmosis to remove 100% of the total amount of water needed to be removed to make the desired fruit/vegetable juice concentrate product.

11. The method of claim 10 for processing raw fruit/vegetable juice to form a food product, comprising: a complete fractionation of the raw fruit/vegetable juice.

12. The method of claim 10, wherein the step of membrane separation is done in three stages, microfiltration, ultrafiltration, and nanofiltration.

13. The method of claim 10, wherein carrier fluid for the organic-acids concentrate is a small portion of ultrafiltered fruit/vegetable juice, and carrier fluid for the minerals concentrate is a small portion of deacidified fruit/vegetable juice.

14. The method of claim 10, whereby the organic-acids concentrate, the mineral salts concentrate, and the corresponding carrier fluid are combined into the electrodialysis concentrate.

\* \* \* \* \*